(No Model.)
L. BERGER & J. MÜLLER.
CLAMP.
No. 368,273. Patented Aug. 16, 1887.
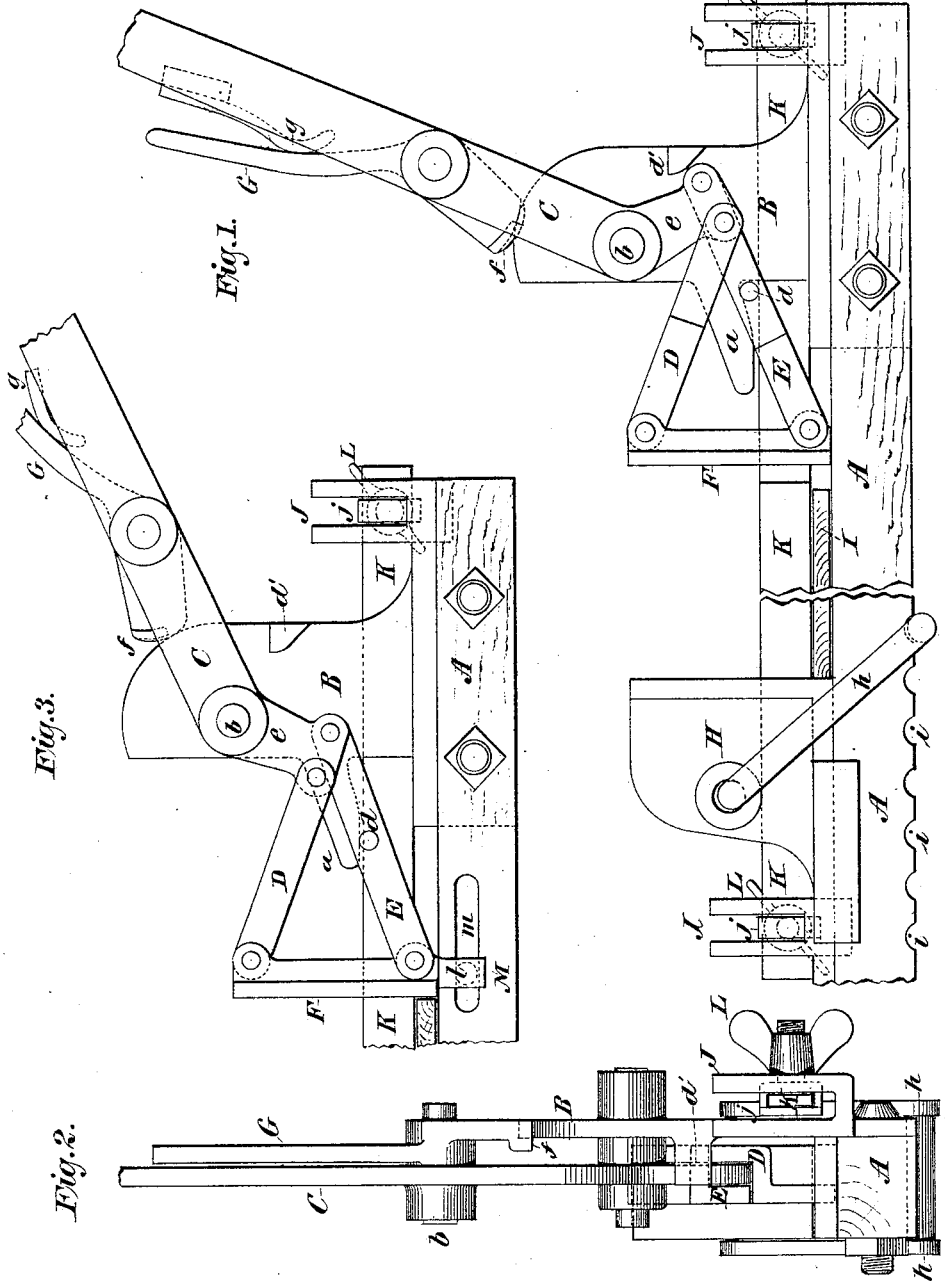
WITNESSES:
Gustave Dieterich
T. F. Bourne
INVENTORS
Ludwig Berger
and
Johannes Müller
BY Briesen & Steele
ATTORNEYS

UNITED STATES PATENT OFFICE.

LUDWIG BERGER, OF NEW YORK, N. Y., AND JOHANNES MÜLLER, OF JERSEY CITY, NEW JERSEY.

CLAMP.

SPECIFICATION forming part of Letters Patent No. 368,273, dated August 16, 1887.

Application filed March 28, 1887. Serial No. 232,649. (No model.)

*To all whom it may concern:*

Be it known that we, LUDWIG BERGER, of the city, county, and State of New York, and JOHANNES MÜLLER, of Jersey City, Hudson county, New Jersey, have invented a new and Improved Clamp, of which the following is a full, clear, and exact description.

The object of our invention is to provide a clamp for carpenters, book-binders, and the like.

The invention consists, principally, in combining a movable head-block with two links that are joined to one lever, so that the head-block will always maintain its proper vertical position while being adjusted.

The invention also consists in combining with the head and tail blocks of a clamp an adjustable bar for holding down the article clamped and preventing the same from bulging up under the influence of end pressure.

Reference is to be had to the accompanying drawings, forming part of this specification, in which Figure 1 is a side view of our improved clamp. Fig. 2 is an end view of same; and Fig. 3 is a side view of the head portion of our clamp, showing a modification of a part.

A in the drawings is a bar or plate forming the base of our improved clamp.

B is a bracket firmly secured to the base A. The bracket B is preferably made rounding on top, as shown, and has a projection or toe, *a*, in front.

C is a lever pivoted to the bracket B at *b*. To the short arm *e* of the lever C, and on either side of same, are pivoted the links D and E.

F is the movable head-block, connected pivotally with the shorter link, D, at its upper part and with the longer link, E, at its lower part. The rear end of the link D is pivoted to the lever C in advance of the pivot that joins said lever C with the link E.

G is a friction-pawl pivoted to the lever C above the bracket B, the short or lower end of which pawl G rests upon the bracket B, and is pressed into engagement therewith in front of the lever C by the spring *g*. The pawl G has by preference a lip, *f*, bearing against the face of the bracket, as indicated in Fig. 2, to keep it in contact with the edge of the bracket.

A pin or stud, *d*, projects from the link E beneath the curved toe *a*. A stud, *d'*, projects from the bracket B to limit the upward movement of the lever C; but this stud may be omitted.

To move the head-block F forward from the position shown in Fig. 1 to that shown in Fig. 3, pressure is brought to bear upon the long end of lever C, which, turning on its pivot *b*, throws the short arm *e* forward, which arm *e*, by means of the links D E, moves the block F forward, as shown in Fig. 3. The pin *d* passes under the toe *a*, which prevents the link F from rising, thereby keeping the block F on the base A.

When the lever C has been lowered to a sufficient extent, the pawl G, by frictional contact with the bracket B prevents the lever from moving upward, thereby keeping the head-block F in the forward position.

To retreat the block F, the pawl G is first disengaged from contact with the bracket B, when the lever C can be raised, which latter movement draws the arm *e* inward, and with it the links D and E, and thereby the block F. The great importance of this arrangement lies in the fact that the links D and E, which connect the lever C with the upper and lower ends of the head-block, serve to always maintain said head-block in the desired vertical position—that is, at right angles with the base A.

H is a tail-block or resisting-piece, which is held on the base A preferably by means of the bail *h*, which may enter recesses *i* in the base, as shown.

To use the clamp—as, for instance, in gluing pieces of wood together—the head-block F is drawn inward, as shown in Fig. 1. The pieces of wood I are placed on the base A close up to the head-block F, and the tail-block H is then pushed close up to the piece of wood and secured thereby, the bail *h* passing into the appropriate recess, *i*, as shown. The lever C is then pressed down, which forces the head-block F forward, pressing the pieces of wood firmly together. The lever is then held in this position by the pawl G, as before described.

When thin pieces of wood or other material are under pressure, as above described, they are apt to be bulged upward or warped by this pressure. To prevent this and to keep them perfectly level and in position on the base, we provide the following device: Near the bracket B, and secured to it or to the base A, are upright studs or posts J, which receive between them one end of a rod or bar, K, the other end of which is received between similar posts J, that are placed near the foot-piece H. The middle portion of the bar K is to rest on the wood I or article clamped. The rod K may be held to the posts J at any desired height by means of the sleeve $j$, through which it passes, said sleeve being placed between two posts J at each end. This sleeve is provided with a thumb-screw, L; but other means for clamping the rod K may be used, if desired.

In using the rod K the pieces to be clamped are first adjusted in the clamp, the rod K then pressed down upon them, and secured at the required height by the screws L. The lever C is then pressed down, as before described, to clamp the wood. The rod K prevents the article in the clamp from springing upward.

Instead of using the friction-pawl G, as shown, ratchet-and-pawl gear may be used. In the modification shown in Fig. 3 the block F is prevented from moving upward by means of the projection M, carrying a pin, $l$, which enters a slot, $m$, in the base A. This is equivalent to the toe $a$ and pin $d$.

Having now described our invention, what we claim is—

1. The base A, bracket B, lever C, pivoted thereto, and pawl G, pivoted to lever C, combined with the two links D E and movable head-block F, said links D E being pivoted on one end to lever C and on the other end to the movable head-block F, and with a suitable tail-piece carried by the base A, substantially as described.

2. The base A, bracket B, and lever C, pivoted to the bracket B, in combination with the links D and E and movable head-block F, the links D and E being pivoted to the lever C and head-block F, and means to prevent said head-block from rising, and a suitable tail-piece carried by the base A, substantially as described.

3. The base A, head-block F, and tail-piece H of a clamp, combined with the retaining-bar K, vertically adjustable and carried by posts J J, and extending across the space between the head and tail blocks, substantially as described.

4. The base A, upright posts J, and sleeves $j$ for receiving the bar K, and screws L on sleeves $j$ for holding the bar K in position against the posts J, in combination with said rod K and with the movable head-block F and tail-piece H, substantially as described.

5. The base A, bracket B, lever C, links D E, movable head-block F, and means for preventing said head-block F from rising, in combination with the rod K and means for securing same at the desired height, and tail-piece H, as set forth.

6. The base A, bracket B, lever C, links D E, movable head-block F, toe $a$, and pin $d$, in combination with the tail-piece H of a clamp, substantially as described.

LUDWIG BERGER.
JOHANNES MÜLLER.

Witnesses:
T. F. BOURNE,
HARRY M. TURK.